(12) United States Patent
Oohashi et al.

(10) Patent No.: US 7,132,775 B2
(45) Date of Patent: Nov. 7, 2006

(54) STATOR OF DYNAMOELECTRIC MACHINE AND METHOD FOR MANUFACTURING STATOR WINDING

(75) Inventors: Atsushi Oohashi, Tokyo (JP); Takushi Takizawa, Tokyo (JP); Yukiyoshi Ohnishi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/520,411

(22) PCT Filed: Dec. 26, 2002

(86) PCT No.: PCT/JP02/13675

§ 371 (c)(1),
(2), (4) Date: Jan. 6, 2005

(87) PCT Pub. No.: WO2004/062065

PCT Pub. Date: Jul. 22, 2004

(65) Prior Publication Data

US 2005/0258704 A1    Nov. 24, 2005

(51) Int. Cl.
*H02K 3/00* (2006.01)
*H02K 3/12* (2006.01)
*H02K 3/28* (2006.01)

(52) U.S. Cl. .................... 310/201; 310/206
(58) Field of Classification Search ........ 310/216–218, 310/201, 206–208
See application file for complete search history.

(56) References Cited

U.S. PATENT DOCUMENTS

| | | | | |
|---|---|---|---|---|
| 2,919,357 A | * | 12/1959 | Lung | 310/42 |
| 3,028,266 A | * | 4/1962 | Larsh | 427/104 |
| 5,166,567 A | * | 11/1992 | Kneisley et al. | 310/216 |
| 5,587,619 A | | 12/1996 | Yumiyama et al. | |
| 6,049,154 A | * | 4/2000 | Asao et al. | 310/201 |
| 6,960,857 B1 | * | 11/2005 | Oohashi et al. | 310/179 |
| 2001/0011851 A1 | | 8/2001 | Asao et al. | |

FOREIGN PATENT DOCUMENTS

| | | |
|---|---|---|
| CN | 1154591 A | 7/1997 |
| DE | 41 22 076 A1 | 1/1992 |
| EP | 1 294 076 A2 | 3/2003 |
| FR | 2 846 806 A | 5/2004 |
| GB | 2 202 170 A | 9/1988 |
| JP | 62-89455 A | 4/1987 |
| JP | 63-194543 A | 8/1988 |

(Continued)

*Primary Examiner*—Tran Nguyen
(74) *Attorney, Agent, or Firm*—Sughrue Mion, PLLC

(57) ABSTRACT

The present invention provides a dynamoelectric stator and a method for the manufacture thereof enabling electrical insulation properties to be improved by forming slot-housed portions with a racetrack-shaped cross section to suppress damage to an electrically-insulating coating arising during mounting of a stator winding to a stator core.

The construction is such that the slot-housed portions of the stator winding are formed with the racetrack-shaped cross section, and are housed inside slots so as to line up in single columns in a radial direction with a longitudinal direction of the cross section of the slot-housed portions aligned in a circumferential direction.

Thus, because short sides of the slot-housed portions facing inner circumferential side surfaces of the slots form convex curved surfaces, the occurrence of damage to the electrically-insulating coating resulting from rubbing between the short sides of the slot-housed portions and the inner circumferential side surfaces of the slots during insertion of the slot-housed portions into the slots is suppressed, thereby improving electrical insulation properties.

7 Claims, 9 Drawing Sheets

FOREIGN PATENT DOCUMENTS

| | | |
|---|---|---|
| JP | 6/189482 A | 7/1994 |
| JP | 7-298528 A | 11/1995 |
| JP | 11-187599 A | 7/1999 |
| JP | 2003-61289 A | 2/2003 |

* cited by examiner

STATOR OF DYNAMOELECTRIC MACHINE AND METHOD FOR MANUFACTURING STATOR WINDING

TECHNICAL FIELD

The present invention relates to a dynamoelectric stator and a method for manufacturing a stator winding therefor mounted to an automotive vehicle such as a passenger car, a truck, an electric train, etc., and particularly to a stator winding and a method for manufacture thereof enabling damage to an electrically-insulating coating resulting from contact between slot-housed portions of the stator winding and inner circumferential side surfaces of slots to be reduced.

BACKGROUND ART

FIG. 12 is a cross section explaining a conventional dynamoelectric stator construction such as that described in Japanese Patent Laid-Open No. SHO 63-194543 (Gazette), for example, and FIGS. 13 to 17 are all diagrams explaining a method for manufacturing the conventional dynamoelectric stator.

This conventional dynamoelectric stator 1, as shown in FIG. 12, includes: a stator core 2; and a stator winding 4 installed in the stator core 2.

The stator core 2 is constructed by laminating a predetermined number of magnetic steel sheets punched into a predetermined shape, being constructed such that tooth portions 7 disposed so as to extend radially inward from an annular core back portion 6 are arranged at a predetermined pitch in a circumferential direction. Slots 3 are defined between adjacent tooth portions 7. Flange portions 5 are formed on tip portions of each of the tooth portions 7 so as to project circumferentially. These flange portions 5 serve a function of collecting magnetic flux, and also serve a function of preventing dislodgment of the stator winding 4 by closing approximately half a width of the openings of the slots 3.

The stator winding 4 is installed in the stator core 2 such that three-phase output can be obtained. In each of the slots 3, slot-housed portions 12a, described below, formed by pressing and deforming a portion of conductor wires 11 having a circular cross section into a rectangular cross section are housed so as to line up in single columns in a radial direction.

Furthermore, heat-tolerant insulators 8 are mounted into each of the slots 3, ensuring electrical insulation between the stator core 2 and the stator winding 4.

A method for forming the stator winding 4 will now be explained with reference to FIGS. 13 to 17.

First, as shown in FIG. 13, a first rectangular winding portion 12 is formed by winding a single conductor wire 11 having a circular cross section into a generally rectangular shape for six winds, and then winding the conductor wire 11 projecting from this rectangular winding portion 12 for six winds so as to form a second rectangular winding portion 12. A lap winding 10 having a plurality of rectangular winding portions 12 is prepared from the single conductor wire 11 by performing this operation repeatedly.

Next, each of the rectangular winding portions 12 of the lap winding 10 are mounted onto a press forming machine 13, as shown in FIG. 14. Here, six slot-housed portions 12a are stacked in single columns and inserted between a stopper 15 and slides 14 slidably supported by springs 16. Then, the slot-housed portions 12a are pressed in the direction of the arrow by a pusher 17. In this manner, as shown in FIG. 15, the slot-housed portions 12a of each of the rectangular winding portions 12 of the lap winding 10 are deformed into a rectangular cross section. Moreover, coil end portions 12b linking the slot-housed portions 12a have a circular cross section.

Then, the slot-housed portions 12a of the lap winding 10 are inserted from an inner circumferential side into each of the slots 3 mounted with the insulators 8 as shown in FIG. 16. Thereafter, tip surfaces of the tooth portions 7 are pressed by a roller, etc., in directions indicated by the arrows F in FIG. 17. In this manner, penetrating apertures 9 formed on the tip portions of the tooth portions 7 are crushed, and portions on first and second circumferential sides of the penetrating apertures 9 are pushed circumferentially outward to form the flange portions 5, obtaining the stator 1 shown in FIG. 12. In this stator 1, the slot-housed portions 12a having a rectangular cross section are housed in six layers in each of the slots 3 so as to line up in single columns in a radial direction with longitudinal axes of their rectangular cross sections aligned in a circumferential direction.

However, in the conventional method for manufacturing the stator 1, because six slot-housed portions 12a having a circular cross section are stacked in a single column and deformed by pressing them simultaneously with a pusher 17, the slot-housed portions 12a having a circular cross section are flattened while being in direct contact with each other, making it difficult to achieve a high degree of flatness on the long sides of each of the flattened slot-housed portions 12a. As a result, space factor when the slot-housed portions 12a are housed inside the slots 3 is reduced, giving rise to reductions in output. Furthermore, because first and second circumferential sides of the slot-housed portions 12a are restricted by the slides 14 and the stopper 15 when the slot-housed portions 12a are deformed by pressing, the flattened slot-housed portions 12a are deformed into a generally rectangular cross section with short sides also becoming flat surfaces. As a result, corner portions are formed on the short sides of the flattened slot-housed portions 12a, and when the slot-housed portions 12a are inserted into the slots 3, the corner portions of the slot-housed portions 12a rub against the inner circumferential side surfaces of the slots 3, damaging an electrically-insulating coating on the conductor wires 11, thereby making electrical insulation properties poor.

DISCLOSURE OF THE INVENTION

The present invention aims to solve the above problems and an object of the present invention is to provide a dynamoelectric stator enabling electrical insulation properties to be improved by forming slot-housed portions with a racetrack-shaped cross section to suppress rubbing between circumferential side surfaces of the slot-housed portions and inner circumferential side surfaces of slots occurring when the slot-housed portions are inserted into the slots and also to suppress damage to an electrically-insulating coating on conductor wires.

Another object of the present invention is to provide a method for manufacturing a dynamoelectric stator winding enabling electrical insulation properties to be improved and enabling space factor to be increased by pressing and deforming slot-housed portions in a cross section flattening process in which slot-housed portions having a circular cross section are pressed and deformed between a pair of flat pressing plates so as to have a racetrack-shaped cross section in which flattened long sides are flat surfaces and short sides are convex curved surfaces to suppress the occurrence of damage to an electrically-insulating coating on conductor wires when the slot-housed portions are insert into slots.

In order to achieve the above object, according to one aspect of the present invention, there is provided a dynamoelectric stator wherein a stator winding has: a plurality of slot-housed portions housed in slots; and coil end portions linking together end portions of the slot-housed portions that are housed in pairs of the slots separated by a predetermined number of slots, and the slot-housed portions are formed with a racetrack-shaped cross section, and are housed so as to line up in at least one column in a radial direction with a longitudinal direction of the cross section aligned in a circumferential direction so as to be in close contact with each other.

According to another aspect of the present invention, there is provided a method for manufacturing a dynamoelectric stator including a cross section flattening process in which slot-housed portions having a circular cross section are individually held between flat pressing plates and shaped into a racetrack-shaped cross section by applying pressure to the slot-housed portions with the pressing plates without restraining the slot-housed portions in a direction of expansion.

BEST MODE FOR CARRYING OUT THE INVENTION

Preferred embodiments of the present invention will now be explained with reference to the drawings.

Embodiment 1

Figure 1:
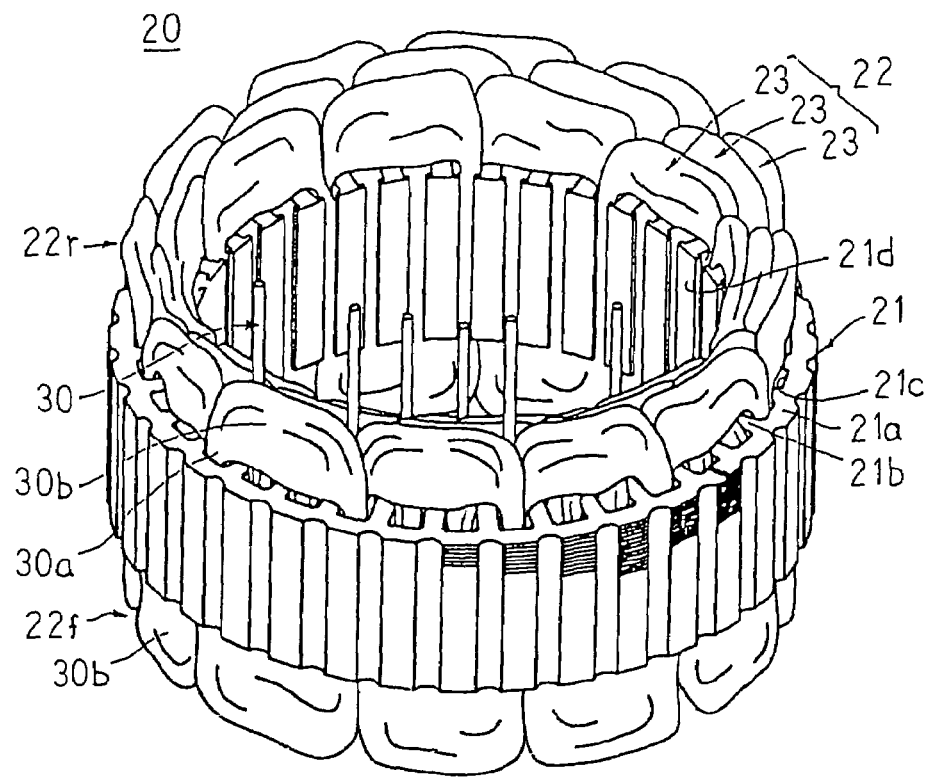
FIG. 1 is a perspective showing a dynamoelectric stator according to Embodiment 1 of the present invention.
Figure 2:
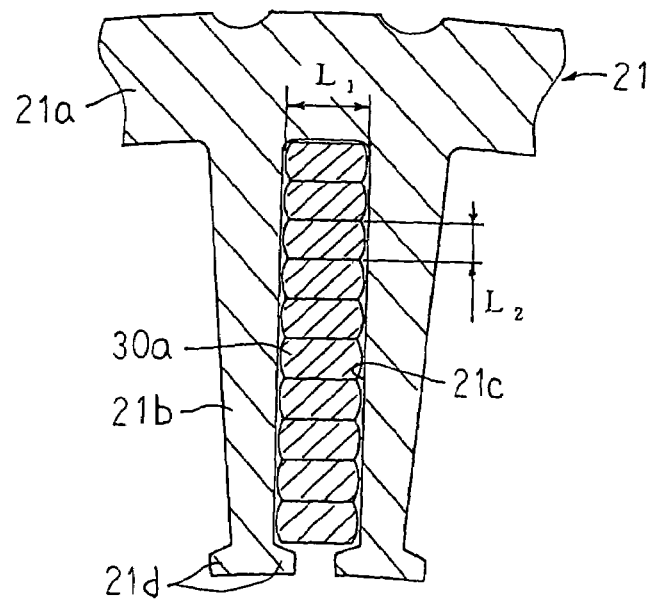
FIG. 2 is a partial cross section showing a slot-housed state of a stator winding in the dynamoelectric stator according to Embodiment 1 of the present invention.
Figure 3:
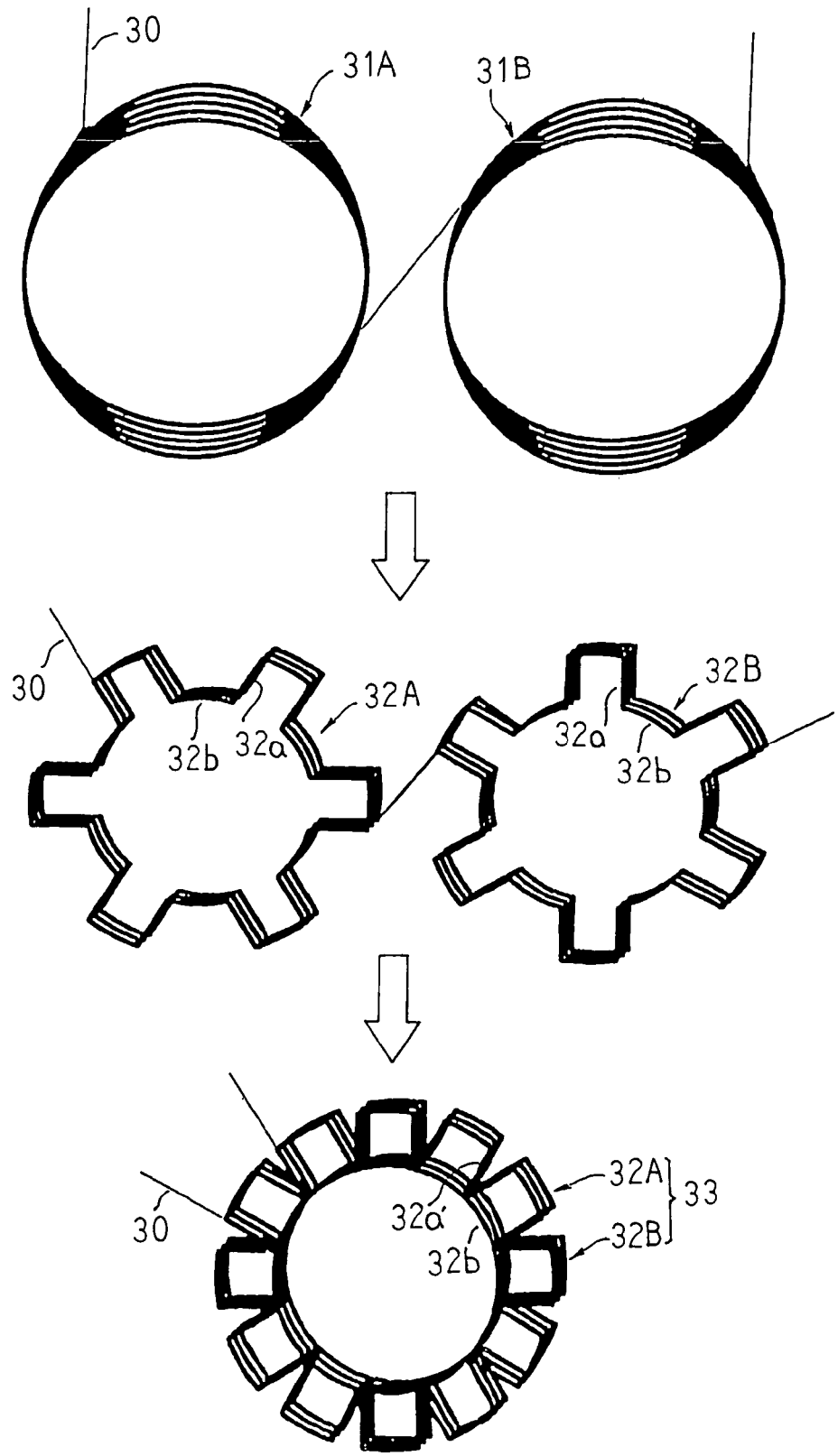
FIG. 3 is a process diagram explaining a process for manufacturing a star-shaped winding unit in a method for manufacturing the dynamoelectric stator according to Embodiment 1 of the present invention.
Figure 4:
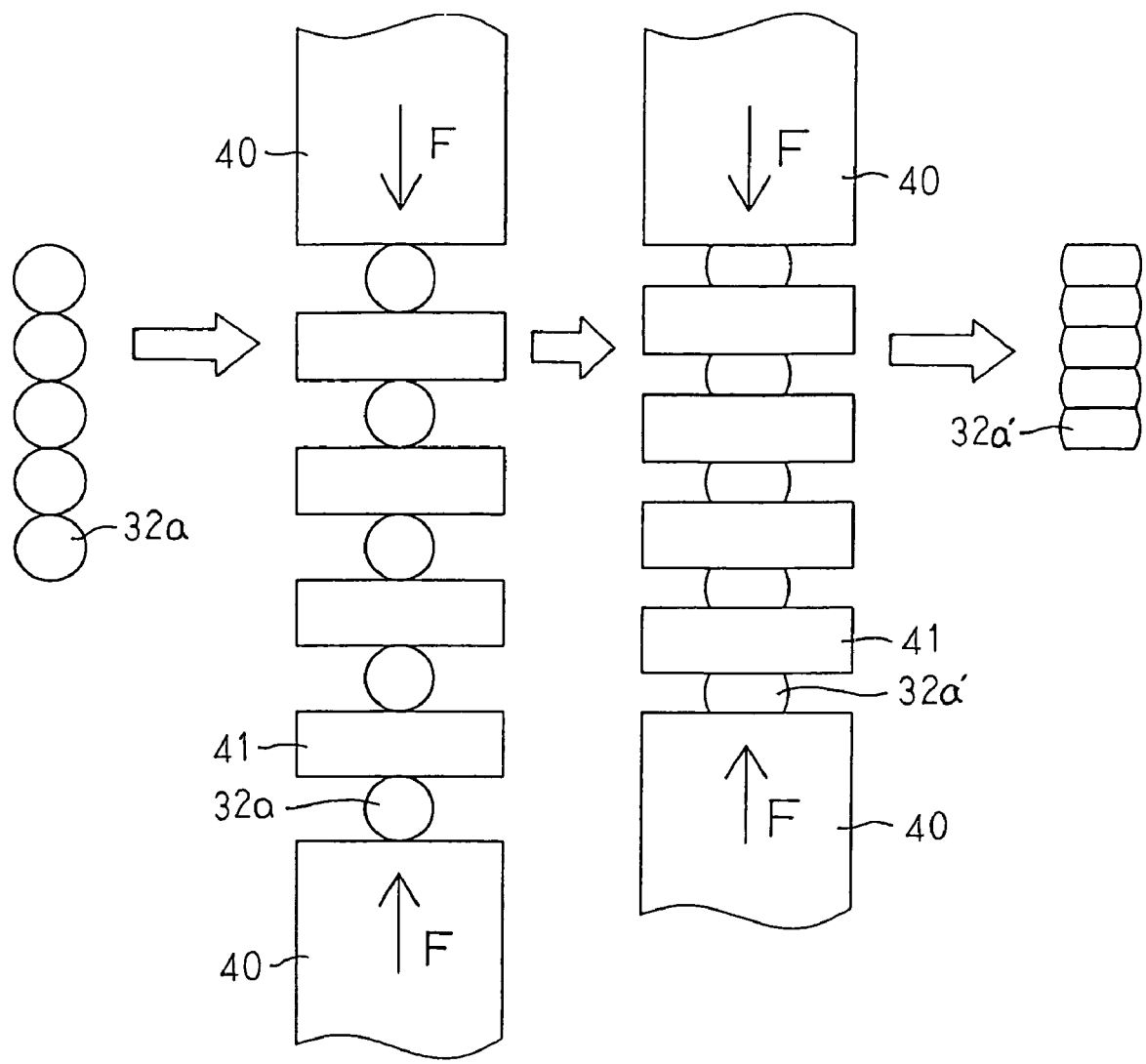
FIG. 4 is a process diagram explaining a cross section flattening process for slot-housed portions of the star-shaped winding unit in the method for manufacturing the dynamoelectric stator according to Embodiment 1 of the present invention.
Figure 5:
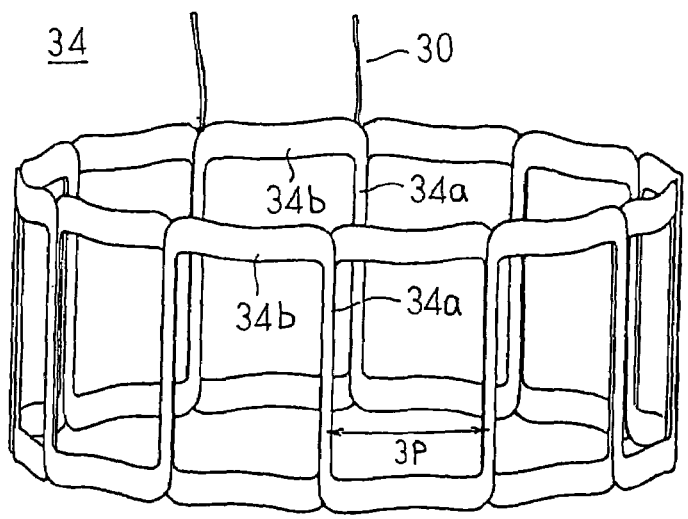
FIG. 5 is a perspective showing a distributed winding unit in the dynamoelectric stator according to Embodiment 1 of the present invention.
Figure 6:
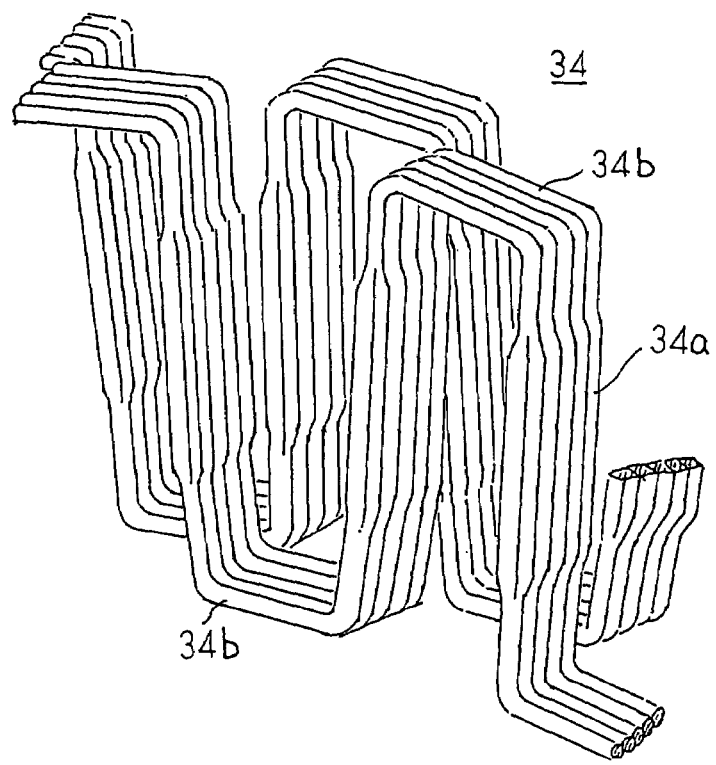
FIG. 6 is a partial enlargement showing the distributed winding unit in the dynamoelectric stator according to Embodiment 1 of the present invention.
Figure 7:
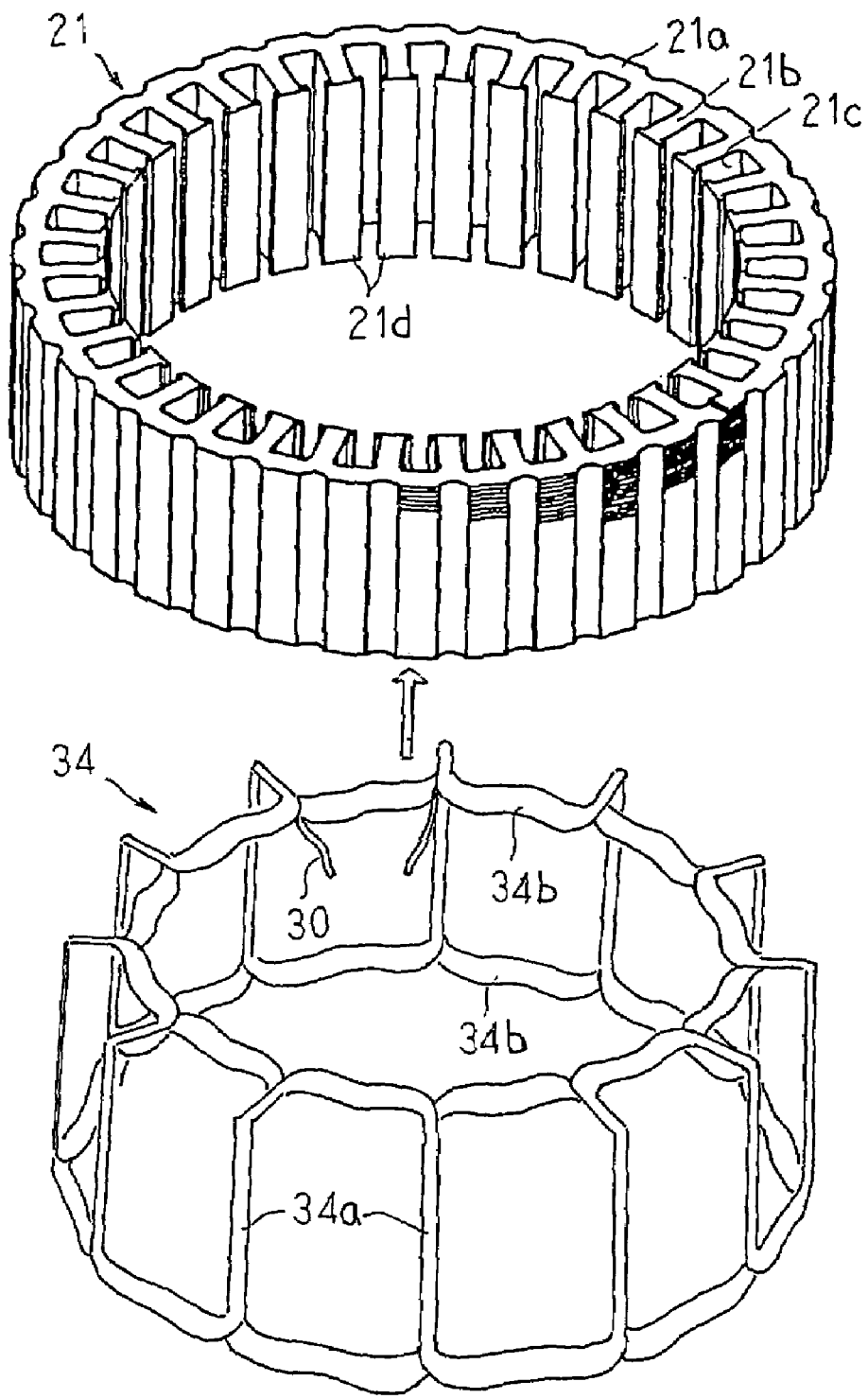
FIG. 7 is a process diagram explaining a process for mounting the distributed winding unit into a stator core in the dynamoelectric stator according to Embodiment 1 of the present invention.
Figure 8:
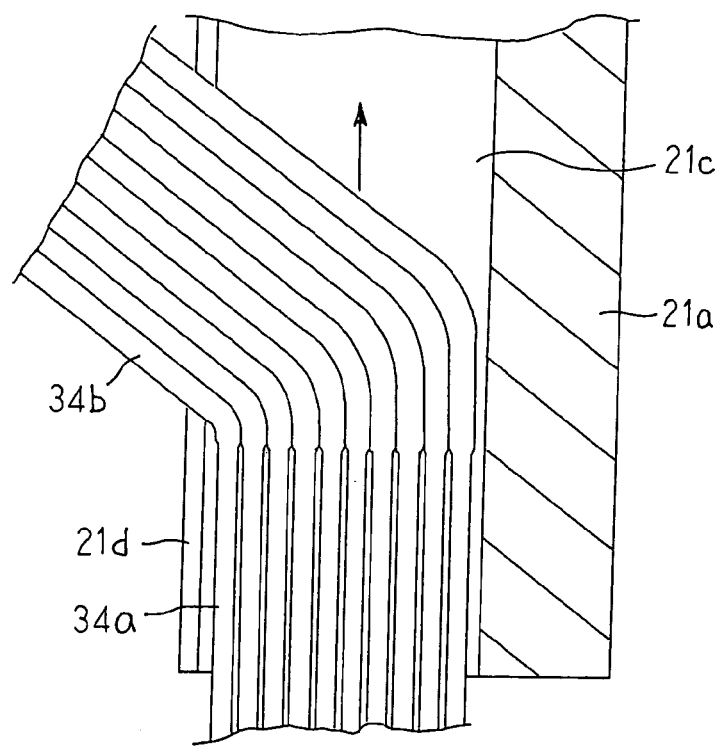
FIG. 8 is a partial cross section explaining the process for mounting the distributed winding unit into the stator core in the dynamoelectric stator according to Embodiment 1 of the present invention.
Figure 9:
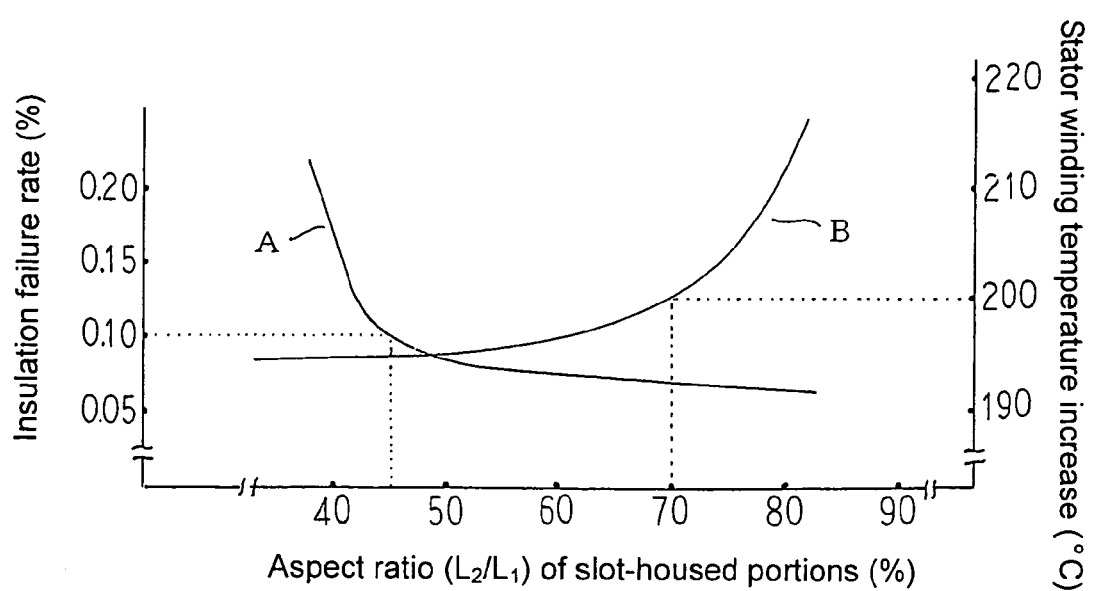
FIG. 9 is a graph showing relationships between an aspect ratio of the slot-housed portions and insulation failure rate and between the aspect ratio of the slot-housed portions and temperature increases in the stator winding in the dynamoelectric stator according to Embodiment 1 of the present invention.

FIG. 1 is a perspective showing a dynamoelectric stator according to Embodiment 1 of the present invention, FIG. 2 is a partial cross section showing a slot-housed state of a stator winding in the dynamoelectric stator according to Embodiment 1 of the present invention, FIG. 3 is a process diagram explaining a process for manufacturing a star-shaped winding unit in a method for manufacturing the dynamoelectric stator according to Embodiment 1 of the present invention, FIG. 4 is a process diagram explaining a cross section flattening process for slot-housed portions of the star-shaped winding unit in the method for manufacturing the dynamoelectric stator according to Embodiment 1 of the present invention, FIG. 5 is a perspective showing a distributed winding unit in the dynamoelectric stator according to Embodiment 1 of the present invention, FIG. 6 is a partial enlargement showing the distributed winding unit in the dynamoelectric stator according to Embodiment 1 of the present invention, FIG. 7 is a process diagram explaining a process for mounting the distributed winding unit into a stator core in the dynamoelectric stator according to Embodiment 1 of the present invention, FIG. 8 is a partial cross section explaining the process for mounting the distributed winding unit into the stator core in the dynamoelectric stator according to Embodiment 1 of the present invention, and FIG. 9 is a graph showing relationships between an aspect ratio of the slot-housed portions and insulation failure rate and between the aspect ratio of the slot-housed portions and temperature increases in the stator winding in the dynamoelectric stator according to Embodiment 1 of the present invention.

In FIGS. 1 and 2, a stator 20 is provided with: a cylindrical stator core 21; and a stator winding 22 installed in the stator core 21.

The stator core 21 is prepared into a cylindrical shape by laminating and integrating a magnetic steel sheet pressed into a predetermined shape, and has: an annular core back portion 21a; tooth portions 21b each projecting radially inward from the core back portion 21a, the tooth portions 21b being disposed at a predetermined pitch in a circumferential direction; slots 21c defined by adjacent pairs of the tooth portions 21b; and flange portions 21d projecting outward in first and second circumferential directions from tip portions of the tooth portions 21b. Here, thirty-six slots 21c are formed on the stator core 21 at a uniform angular pitch in a circumferential direction. Thus, in this stator 20, a stator winding 22 constituted by a single three-phase alternating-current winding is obtained for a rotor having twelve magnetic poles (not shown). In other words, the slots 21c are formed at a ratio of one slot per phase per pole. Furthermore, the cross-sectional shape of each of the tooth portions 21b perpendicular to a central axis of the stator core 21 is formed with a generally trapezoidal shape tapering toward an inner radial side, making the cross-sectional shape of each of the slots 21c perpendicular to the central axis of the stator core 21 rectangular.

The stator winding 22 is provided with three distributed winding phase portions 23 mounted to the stator core 21 such that the slots 21c in which each is mounted are mutually offset by one slot. The three-phase alternating-current winding is constructed by forming the three distributed winding phase portions 23 into an alternating-current connection such as a Y connection, for example.

Each of the distributed winding phase portions 23 is constructed by winding one conductor wire 30 composed of a copper wire material covered with an electrically-insulating coating into a wave shape in every third slot 21c for five turns in a first circumferential direction (clockwise, for example) then continuing to wind the conductor wire 30 into a wave shape in every third slot 21c for five turns in a second circumferential direction (counterclockwise, for example). Portions of the conductor wires 30 housed inside the slots 21c (hereinafter called "slot-housed portions 30a") are formed with a flattened cross-sectional shape having a racetrack-shaped cross section, and portions of the conductor wires 30 linking together slot-housed portions 30a housed in slots 21c three slots apart at axial ends of the stator core 21 (hereinafter called "coil end portions 30b") are formed with a circular cross section. Furthermore, a length $L_1$ of a long side of the racetrack-shaped cross section of the slot-housed portions 30a is larger than a gap between the flange portions 21d (a slot opening), being generally equal to a circumferential width of the slots 21c. A diameter of the coil end portions 30b is smaller than the gap between the flange portions 21d.

The slot-housed portions 30a are housed in each of the slots 21c with longitudinal axes of their racetrack-shaped cross sections aligned in a circumferential direction and with their long sides in close contact with each other so as to line up in a single column in a radial direction. An aspect ratio ($L_2/L_1$) of each of the slot-housed portions 30a is constant. Furthermore, although not shown, insulators may be mounted inside the slots 21c. Moreover, $L_2$ is a length of a short side of the racetrack-shaped cross section of the slot-housed portions 30a.

Five of the slot-housed portions 30a housed inside each slot 21c are each linked at a first axial end of the stator core 21 by a coil end portion 30b to five slot-housed portions 30a housed in the slot 21c three slots away in a first circumferential direction, and each linked at a second axial end of the stator core 21 by a coil end portion 30b to five slot-housed portions 30a housed in the slot 21c three slots away in a second circumferential direction. The five remaining slot-housed portions 30a housed inside each slot 21c are each linked at the first axial end of the stator core 21 by a coil end portion 30b to five slot-housed portions 30a housed in the slot 21c three slots away in the second circumferential direction, and each linked at the second axial end of the stator core 21 by a coil end portion 30b to five slot-housed portions 30a housed in the slot 21c three slots away in the first circumferential direction.

In this manner, the conductor wires 30 of the distributed winding phase portions 23 projecting from each of the slots 21c are distributed half each in first and second circumferential directions. In each of the distributed winding phase portions 23, bundles of five coil end portions 30b are arranged in a circumferential direction at a pitch of three slots. Thus, at the first and second axial ends of the stator core 21, layers of the bundles of coil end portions 30b arranged in a circumferential direction at a pitch of three slots are mutually offset by one slot in a circumferential direction and arranged in three layers in a radial direction, constituting coil end groups 22f and 22r of the stator winding 22.

Next, a method for manufacturing the stator 20 will be explained with reference to FIGS. 3 to 8.

First, as shown in FIG. 3, a first winding unit 31A is prepared by winding one conductor wire 30 having a circular cross section into a ring shape for five winds, and a second winding unit 31B is prepared by winding the conductor wire 30 into a ring shape for another five winds. Next, first and second star-shaped winding units 32A and 32B are prepared by bending the first and second winding units 31A and 31B into star-shaped patterns in which end portions of adjacent straight slot-housed portions 32a are alternately linked at an inner circumferential end and an outer circumferential end by angular C-shaped coil end portions 32b are stacked in five layers.

Here, each of the bundles of slot-housed portions 32a of the first star-shaped winding unit 32A is set in a press forming machine (not shown). At this time, as shown in FIG. 4, each of the bundles of slot-housed portions 32a is stacked in a single column between a pair of pushers (pressing plates) 40 and flat pressing plates 41 are interposed between each of the slot-housed portions 32a. Then, a predetermined pressing force F is applied to the pair of pushers 40 to shape each of the slot-housed portions 32a having a circular cross section into slot-housed portions 32a' having a racetrack-shaped cross section, then the first star-shaped winding unit 32A is removed from the press forming machine. Moreover, in FIG. 4, only one pair of pushers 40 is shown, but there are 12 pairs of pushers 40 and the slot-housed portions 32a of the first star-shaped winding unit 32A are all deformed into slot-housed portions 32a' having a racetrack-shaped cross section in a single cross section flattening process. Next, each of the bundles of slot-housed portions 32a of the second star-shaped winding unit 32B is set in the press forming machine, and the slot-housed portions 32a of the second star-shaped winding unit 32B are similarly deformed into slot-housed portions 32a' having a racetrack-shaped cross section in a single cross section flattening process.

Then, a star-shaped winding unit 33 is prepared, as shown in FIG. 3, by folding over the portion of the conductor wire 30 linking the first and second star-shaped winding units 32A and 32B with slot-housed portions 32a' having a racetrack-shaped cross section, and stacking the first and second star-shaped winding units 32A and 32B on top of each other such that the peak portions and the valley portions of the two star-shaped patterns are superposed.

Next, a distributed winding unit 34 is prepared by reshaping the star-shaped winding unit 33 into a cylindrical shape. In this distributed winding unit 34, a conductor wire 30 is wound for ten turns into a wave winding. As shown in FIGS. 5 and 6, bundles of ten slot-housed portions 34a (corresponding to the slot-housed portions 32a' shaped with a racetrack-shaped cross section) are arranged at a pitch of three slots (3P) in a circumferential direction. The ten slot-housed portions 34a in each of the bundles are lined up in a single column in a radial direction with the longitudinal direction of their cross sections aligned in a circumferential direction. Furthermore, five of the slot-housed portions 34a in each of the bundles are alternately linked at first and second axial ends by coil end portions 34b (corresponding to the coil end portions 32b). The remaining five slot-housed portions 34a in each of the bundles are alternately linked at second and first axial ends by coil end portions 34b. Moreover, the coil end portions 34b linking each set of five slot-housed portions 34a face each other in an axial direction.

Next, the coil end portions 34b at the first axial end of the distributed winding unit 34 are bent radially inward. As indicated by the arrow in FIG. 7, the distributed winding unit 34 is mounted to the stator core 21 from an axial direction. Here, as shown in FIG. 8, portions of the coil end portions 34b bent radially inward that are in the vicinity of the slot-housed portions 34a are moved in an axial direction between the flange portions 21d (the slot openings), leading the bundles of slot-housed portions 34a inside each of the slots 21c. After the bundles of slot-housed portions 34a have been led completely inside each of the slots 21c, the coil end portions 34b bent radially inward are restored so as to extend in an axial direction, completing the mounting of a first distributed winding unit 34 into the stator core 21.

A second distributed winding unit 34 is mounted to the stator core 21 in a similar manner, and a third distributed winding unit 34 is mounted to the stator core 21 in a similar manner, preparing the stator 20 shown in FIG. 1. At this time, the distributed winding units 34 are mounted to the stator core 21 such that the slots 21c into which the slot-housed portions 34a of each are inserted are mutually offset by one slot. The distributed winding units 34 mounted to the stator core 21 constitute the distributed winding phase portions 23. The stator winding 22 is constructed by forming the three distributed winding phase portions 23 into an alternating-current connection such as a Y connection, for example.

In the stator 20 according to Embodiment 1, because the slot-housed portions 30a is formed with a racetrack-shaped cross section, short sides of the slot-housed portions 30a have a convex curved surface shape. Thus, when the slot-housed portions 30a inserted into the slots 21c, the curved surface portions of the short sides of the slot-housed portions 30a contact the inner circumferential side surfaces of the slots 21c, suppressing the occurrence of damage to the electrically-insulating coating resulting from the slot-housed portions 30a and the inner circumferential side surfaces of the slots 21c rubbing against each other, thereby improving electrical insulation properties. Similarly, the occurrence of damage to the electrically-insulating coating resulting from the slot-housed portions 30a and the inner circumferential side surfaces of the slots 21c rubbing against each other due to vibrations from the engine, etc., of a vehicle is suppressed in cases in which the stator 20 is mounted to a dynamoelectric machine such as an automotive alternator, etc., also improving electrical insulation properties.

Because slot-housed portions 30a having a racetrack-shaped cross section are housed inside the slots 21c so as to be arranged in single columns with their long sides closely contacting each other, contact surface area between the slot-housed portions 30a is increased and the slot-housed portions 30a can be housed inside the slots 21c densely. As a result, heat generated in the stator winding 22 is more easily transferred to the stator core 21 by means of radially-adjacent slot-housed portions 30a and effectively dissipated from the stator core 21, suppressing extreme temperature increases in the stator winding 22, thereby enabling increased output. Space factor (the ratio occupied by the slot-housed portions 30a inside the slots 21c) is also increased, enabling increased output.

Because slot-housed portions 30a having a racetrack-shaped cross section with a length on a long side that is greater than the slot openings are housed in each of the slots 2a so as to be arranged in a single column in a radial direction such that the longitudinal direction of their long sides are aligned in a circumferential direction and their long sides closely contact each other, dislodgment of the slot-housed portions 30a through the slot openings is prevented, enabling plugs mounted to prevent dislodgment of the slot-housed portions 30a to be eliminated.

In the method for manufacturing of a stator according to Embodiment 1, because first and second star-shaped winding units 32A and 32B are prepared from one conductor wire 30, then flat pressing plates 41 are interposed between slot-housed portions 32a of the first and second star-shaped winding units 32A and 32B and pressed from first and second sides by a pair of pushers 40, slot-housed portions 32a' having a racetrack-shaped cross section with long sides that are flat surfaces are obtained. Thus, when the slot-housed portions 30a of the distributed winding phase portions 23 are housed inside the slots 21c, the long sides of the slot-housed portions 30a are in a state of close contact with each other, enabling space factor to be increased and enabling heat generated in the stator winding 22 to be swiftly transferred to the stator core 21. Furthermore, because the short sides of the racetrack-shaped cross section (the direction of expansion) are not restricted when the slot-housed portions 32a is shaped into the racetrack-shaped cross section, the short sides of the slot-housed portions 32a' reliably become a convex curved surface shape, enabling damage to the electrically-insulating coating occurring when the slot-housed portions 30a are inserted into the slots 21c to be suppressed.

Because the slot-housed portions 32a of the first and second star-shaped winding units 32A and 32B are shaped with a racetrack-shaped cross section simultaneously, the cross section flattening process for deforming the slot-housed portions from a circular cross section to the racetrack-shaped cross section is shortened. In addition, slot-housed portions 32a' having a constant aspect ratio ($L_2/L_1$) can be prepared simply.

Because the distributed winding units 34 are mounted to the stator core 21 from an axial direction by bending the coil end portions 34b at a first axial end of the distributed winding units 34 radially inward and passing the bent coil end portions 34b near the slot-housed portions 34a between the flange portions 21d, slot-housed portions 34a having a length on a long side that is larger than the slot openings can be inserted into the slots 21c simply. Furthermore, because coil end portions 34b having a circular cross section that is less likely to give rise to large bending stresses are bent, damage to the electrically-insulating coating resulting from bending can be suppressed. In addition, because the tip ends of the tooth portions 21b can be formed on the flange portions 21d in advance, a complicated flange portion forming process for pressing tip portions of the tooth portions 21b from an inner circumferential side to form flange portions after the stator winding is mounted is no longer necessary, thereby simplifying the manufacturing process.

The aspect ratio ($L_2/L_1$) of the slot-housed portions will now be investigated with reference to FIG. 9. Moreover, in FIG. 9, curve A is a graph showing a relationship between the aspect ratio of the slot-housed portions and insulation failure rate, and curve B is a graph showing a relationship between the aspect ratio of the slot-housed portions and temperature increase in the stator winding.

First, from curve A it can be seen that the rate of occurrence of insulation failure increases gradually as the aspect ratio is reduced, and the rate of occurrence of insulation failure increases suddenly when the aspect ratio is less than forty-five percent (45%). Consequently, when consideration is given to the rate of occurrence of insulation failure, it is desirable for the aspect ratio of the slot-housed portions to be set to greater than or equal to forty-five percent (45%).

This aspect ratio of the slot-housed portions represents the degree of deformation when a slot-housed portion having a circular cross section is deformed into a racetrack-shaped cross section. Specifically, a smaller aspect ratio means a greater deformation ratio. When a slot-housed portion having a circular cross section is deformed into a racetrack-shaped cross section, the copper wire material plastically deforms into the racetrack-shaped cross section, and the electrically-insulating coating coated on the copper wire material extends along with the deformation of the copper wire material. It can also be inferred that when the amount of deformation in the copper wire material is increased, extension of the electrically-insulating coating cannot keep up, and cracking occurs in the electrically-insulating coating, eventually leading to peeling of the electrically-insulating coating, and insulation failure occurs.

From curve B it can be seen that the temperature of the stator winding rises gradually as the aspect ratio is increased, that the temperature of the stator winding is approximately 200 degrees Celsius (200° C.) when the aspect ratio is seventy percent (70%), and that the temperature of the stator winding rises rapidly when the aspect ratio exceeds seventy percent (70%). It is preferable that the temperature of the stator winding be suppressed to less than or equal to 200 degrees Celsius (200° C.). Consequently, when consideration is given to temperature increases in the stator winding, it is desirable for the aspect ratio of the slot-housed portions to be set to less than or equal to seventy percent (70%).

This aspect ratio of the slot-housed portions represents the degree of flattening. A greater aspect ratio means a smaller degree of flattening, that is, the length of the long sides ($L_1$) is shorter. Now, if the slot-housed portions are housed inside the slots so as to line up in a radial direction with the longitudinal direction of their long sides aligned in a circumferential direction, flat surfaces on the long sides of radially-adjacent slot-housed portions are placed in close contact with each other. Thus, a portion of the heat generated in the slot-housed portions when the stator winding is energized is transferred to adjacent slot-housed portions by means of the portions of the flat surfaces on the long sides contacting each other, and is eventually transferred from the slot-housed portions contacting the bottom surface of the slots to the stator core, and radiated from the stator core. Thus, if the length of the long sides is short, contact surface area between the adjacent slot-housed portions is reduced. As a result, it can be inferred that the quantity of heat transferred from the slot-housed portions to the stator core and radiated will be reduced, and the temperature of the stator winding will rise.

From this, it is desirable for the aspect ratio of the slot-housed portions 30a to be set to greater than or equal to forty-five percent (45%), and less than or equal to seventy percent (70%).

Moreover, in Embodiment 1 above, the slot-housed portions have been explained as being deformed by pressing from a circular cross section to a racetrack-shaped cross section after the first and second star-shaped winding units 32A and 32B are prepared, but the slot-housed portions may also be deformed by pressing from a circular cross section to a racetrack-shaped cross section after the star-shaped winding unit 33 is prepared by stacking the first and second star-shaped winding units 32A and 32B together.

Embodiment 2

Figure 10:
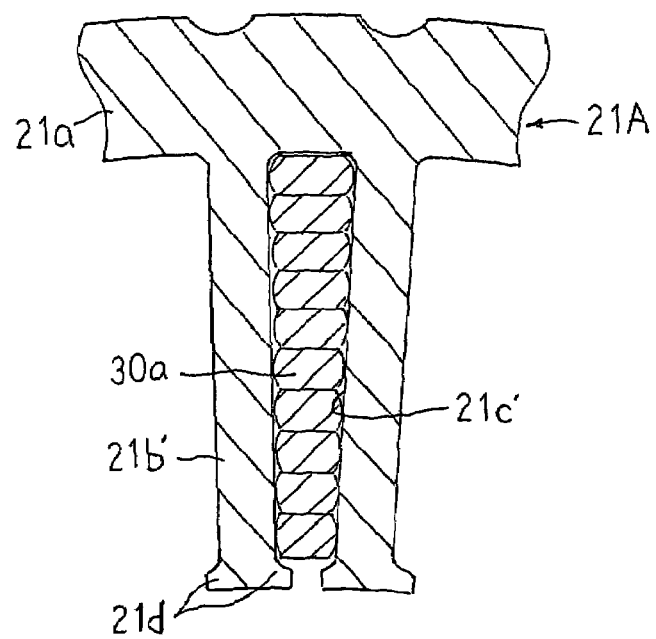
FIG. 10 is a partial cross section showing a slot-housed state of a stator winding in a dynamoelectric stator according to Embodiment 2 of the present invention.

FIG. 10 is a partial cross section showing a slot-housed state of a stator winding in a dynamoelectric stator according to Embodiment 2 of the present invention.

In FIG. 10, in a stator core 21A, a cross section of the tooth portions 21b' perpendicular to a central axis of the stator core 21A is formed in a generally rectangular shape, and a cross section of slots 21c' has a generally trapezoidal shape tapering radially inward. An aspect ratio ($L_2/L_1$) of slot-housed portions 30a housed in the slots 21c' so as to line up in single columns in a radial direction is larger in the slot-housed portions 30a positioned on an inner radial side so as to match the shape of the slots.

Moreover, the rest of this embodiment is constructed in a similar manner to Embodiment 1 above.

A method for manufacturing a stator according to Embodiment 2 will now be explained.

First, first and second star-shaped winding units 32A and 32B are prepared in a similar manner to Embodiment 1 above. Then, each of the bundles of slot-housed portions 32a of the first star-shaped winding unit 32A is set in a press forming machine. At this time, as shown in FIG. 4, one of the slot-housed portions 32a in each of the bundles is disposed between a respective pair of pushers 40. Next, a predetermined pressing force is applied to each pair of pushers 40 to shape a slot-housed portion 32a having a circular cross section into a slot-housed portion 32a' having a racetrack-shaped cross section. This operation is repeated for the five slot-housed portions 32a in each of the bundles while changing the pressing force applied to the pusher 40 each time. In this manner, the five slot-housed portions 32a' in each of the bundles are deformed such that the aspect ratio having a racetrack-shaped cross section is gradually reduced.

Next, the slot-housed portions 32a in each of the bundles of the second star-shaped winding unit 32B are similarly shaped by pressing and deformed such that the aspect ratio of the racetrack-shaped cross section of the five slot-housed portions 32a' in each of the bundles is gradually reduced. At this time, the pressing force on the pushers 40 is adjusted such that the aspect ratios of the slot-housed portions 32a' of the second star-shaped winding unit 32B become smaller than the aspect ratios of the slot-housed portions 32a' of the first star-shaped winding unit 32A. Moreover, there are 12 pairs of pushers 40 and twelve slot-housed portions 32a housed in an equivalent radial position inside the slots 21c' are deformed into slot-housed portions 32a' with a racetrack-shaped cross section having a predetermined aspect ratio in a single cross section flattening process.

Then, a star-shaped winding unit 33 is prepared by folding over the portion of the conductor wire 30 linking the first and second star-shaped winding units 32A and 32B with slot-housed portions 32a' having a racetrack-shaped cross section, and stacking the first and second star-shaped winding units 32A and 32B on top of each other such that the peak portions and the valley portions of the two star-shaped patterns are superposed. Thereafter, a stator is prepared by mounting the star-shaped winding unit 33 to the stator core 21A in a similar manner to Embodiment 1 above.

In this manner, a stator is obtained in which ten slot-housed portions 30a are housed inside each of the slots 21c' so as to line up in single columns in a radial direction with a longitudinal direction of long sides of their flattened cross sections aligned in a circumferential direction and in close contact with each other. The aspect ratios of the ten slot-housed portions 30a lined up in single columns are formed so as to increase gradually radially inward so as to match the generally trapezoidal shape of the slots 21c'.

Consequently, according to Embodiment 2, because aspect ratios of the slot-housed portions 30a lined up in single columns in a radial direction are formed so as to increase gradually radially inward so as to match the generally trapezoidal shape of slots 21c', the slot-housed portions 30a can be housed with a high space factor relative to the generally trapezoidal slots 21c', enabling increased output.

The slot-housed portions 30a are also less likely to move inside the slots 21c', suppressing the occurrence of damage to the electrically-insulating coating resulting from the slot-housed portions 30a and the inner circumferential side surfaces of the slots 21c' rubbing against each other due to vibrations from the engine, etc., of a vehicle, thereby improving electrical insulation properties.

In addition, because the slot-housed portions 32a in each of the bundles in the first and second star-shaped winding units 32A and 32B are deformed individually by pressing with a pair of pushers 40, the aspect ratio of the racetrack-shaped cross sections can be adjusted at will by changing the pressing force of the pusher 40. In this manner, the aspect ratio of the slot-housed portions 30a can be formed so as to match the shape of the slots.

Moreover, in Embodiment 2 above, the slot-housed portions have been explained as being deformed by pressing from a circular cross section to a racetrack-shaped cross section after the first and second star-shaped winding units 32A and 32B are prepared, but the slot-housed portions may also be deformed by pressing from a circular cross section to a racetrack-shaped cross section after the star-shaped winding unit 33 is prepared by stacking the first and second star-shaped winding units 32A and 32B together.

Embodiment 3

Figure 11:
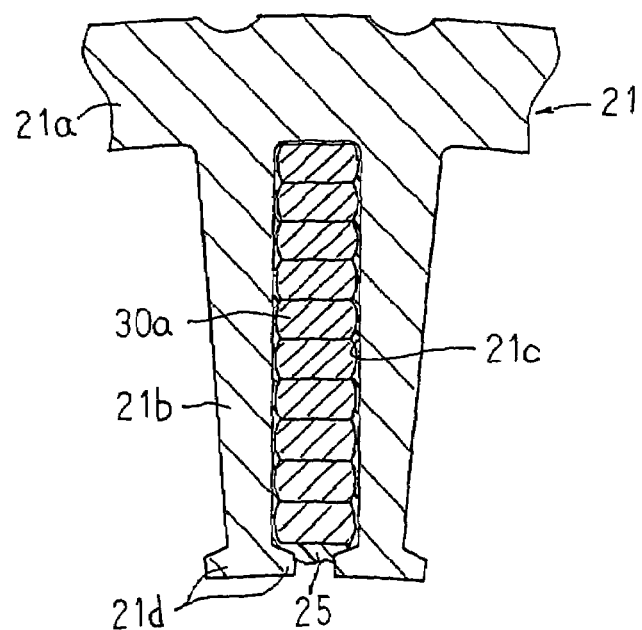
FIG. 11 is a partial cross section showing a slot-housed state of a stator winding in a dynamoelectric stator according to Embodiment 3 of the present invention.
Figure 12:
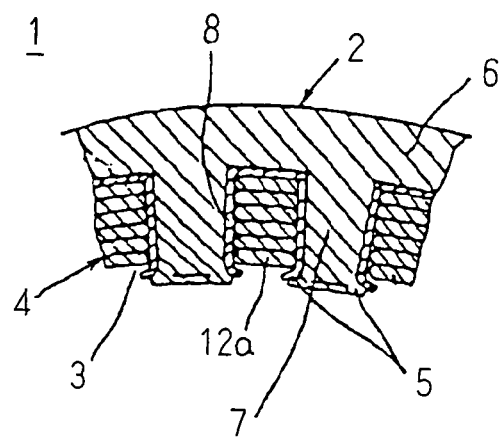
FIG. 12 is a cross section explaining a conventional dynamoelectric stator construction.
Figure 13:
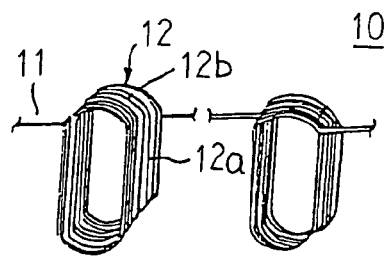
FIG. 13 is a process diagram explaining a process for forming a lap winding in a method for manufacturing a conventional dynamoelectric stator.
Figure 14:
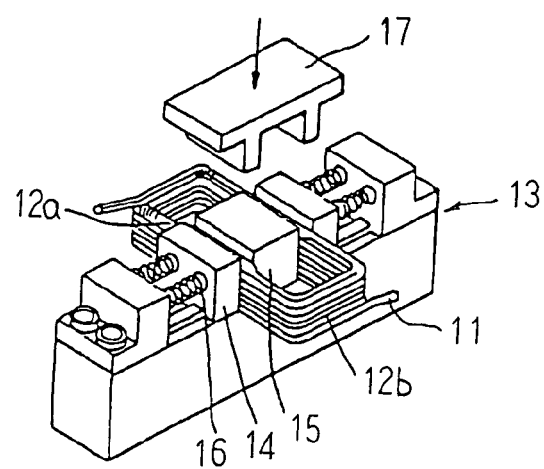
FIG. 14 is a process diagram explaining a process for pressing and deforming slot-housed portions of the lap winding in the method for manufacturing the conventional dynamoelectric stator.
Figure 15:
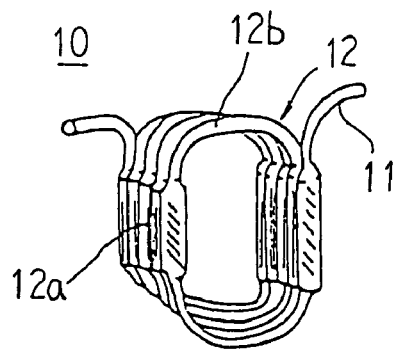
FIG. 15 is a partial perspective explaining the slot-housed portions of the lap winding in the method for manufacturing the conventional dynamoelectric stator.
Figure 16:
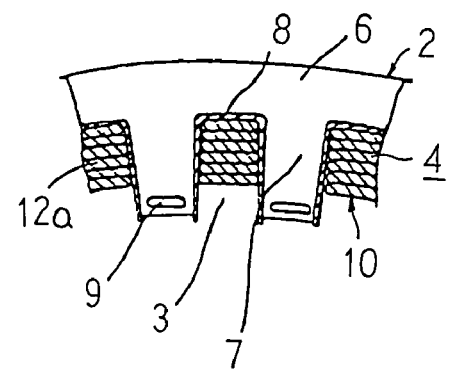
FIG. 16 is a partial cross section explaining a slot-mounted state of the lap winding in the method for manufacturing the conventional dynamoelectric stator.
Figure 17:
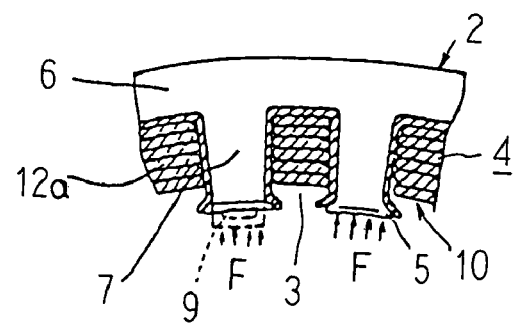
FIG. 17 is a partial cross section explaining a process for forming flange portions on tooth portions in a method for manufacturing a conventional dynamoelectric stator.

FIG. 11 is a partial cross section showing a slot-housed state of a stator winding in a dynamoelectric stator according to Embodiment 3 of the present invention.

In FIG. 11, slots 21c housing slot-housed portions 30a are impregnated with a varnish 25.

Moreover, the rest of this embodiment is constructed in a similar manner to Embodiment 1 above.

According to Embodiment 3, because the slots 21c are impregnated with the varnish 25, the varnish 25 penetrates the gaps between the slot-housed portions 30a and the slots 21c. The slot-housed portions 30a are prevented from moving inside the slots 21c, eliminating the occurrence of damage to the electrically-insulating coating resulting from the slot-housed portions 30a and the inner circumferential side surfaces of the slots 21c rubbing against each other due to vibrations from the engine, etc., of a vehicle, thereby significantly improving electrical insulation properties.

Moreover, in each of the above embodiments, a stator winding constituted by a distributed winding is explained as being used, but the present invention may also be applied to a stator winding constituted by a concentrated winding. Here, a distributed winding is constructed such that conductor wires projecting out of each of the slots are distributed half each in both circumferential directions and enter two slots separated by a predetermined number of slots in both circumferential directions, and a concentrated winding is constructed such that all of the conductor wires projecting out of each of the slots enter one slot separated by a predetermined number of slots in one circumferential direction.

In each of the above embodiments, a stator core in which slots are formed at a ratio of one slot per phase per pole is used, but a stator core in which slots are formed into at a ratio of two slots per phase per pole may also be used.

In each of the above embodiments, the stator winding is explained as being constructed using star-shaped winding units prepared from one conductor wire, but the present invention may also be applied to stator windings constructed using U-shaped conductor segments, and may also be applied to stator windings constructed by installing continuous conductor wires in slots so as to alternately occupy an inner layer and an outer layer in slots at intervals of a predetermined number of slots.

In each of the above embodiments, slot-housed portions are housed inside slots so as to be arranged into single columns in a radial direction, but the slot-housed portions may also be housed inside the slots so as to be arranged into two columns in a circumferential direction, for example.

INDUSTRIAL APPLICABILITY

Because slot-housed portions of a stator winding are formed with a racetrack-shaped cross section as explained above, the occurrence of damage to an electrically-insulating coating resulting from rubbing between the slot-housed portions and inner circumferential side surfaces of slots during mounting of the stator winding to a stator core is suppressed, improving electrical insulation properties of the stator winding, thereby making the stator and the method for manufacturing a stator winding therefor according to the present invention useful as a dynamoelectric stator and a method for manufacturing a stator winding therefor in an automotive alternator, etc., mounted to an automotive vehicle such as an automobile, etc.

The invention claimed is:

1. A dynamoelectric stator comprising:
   a cylindrical stator core in which slots are arranged in a circumferential direction so as to open onto an inner circumferential side; and
   a stator winding mounted to said stator core,
   characterized in that said stator winding comprises a plurality of slot-housed portions housed in each of said slots; and coil end portions linking together end portions of said slot-housed portions that are housed in pairs of said slots separated by a predetermined number of slots,
   wherein said slot-housed portions are formed with a cross section having first and second opposing sides which are straight along their length and third and fourth opposing sides which are curved along their length, and are housed so as to line up in at least one column in a radial direction with a longitudinal direction of said cross section aligned in a circumferential direction so as to be in close contact with each other.

2. The dynamoelectric stator according to claim 1, characterized in that said slot-housed portions are formed so as to satisfy an aspect ratio $L_2/L_1$ that is greater than or equal to forty-five percent and less than or equal to seventy percent ($45\% \leq L_2/L_1 \leq 70\%$), where $L_1$ is a length of the first and second opposing sides and $L_2$ is a length of the third and fourth opposing sides.

3. The dynamoelectric stator according to claim 1, characterized in that said slot-housed portions are housed inside said slots so as to line up in single columns in a radial direction.

4. The dynamoelectric stator according to claim 3, characterized in that said slot-housed portions are formed so as to satisfy an aspect ratio $L_2/L_1$ that is greater than or equal to forty-five percent and less than or equal to seventy percent ($45\% \leq L_2/L_1 \leq 70\%$), where $L_1$ is a length of the first and second opposing sides and $L_2$ is a length of the third and fourth opposing sides.

5. The dynamoelectric stator according to claim 1, characterized in that said slots are formed into a substantially trapezoidal shape tapering radially inward; and aspect ratios of said cross sections of said slot-housed portions housed so as to line up inside said slots in a radial direction are formed so as to increase gradually radially inward so as to match said substantially trapezoidal shape of said slots.

6. The dynamoelectric stator according to claim 5, characterized in that said slot-housed portions are formed so as to satisfy an aspect ratio $L_2/L_1$ that is greater than or equal to forty-five percent and less than or equal to seventy percent ($45\% \leq L_2/L_1 \leq 70\%$), where $L_1$ is a length of the first and second sides and $L_2$ is a length of the third and fourth sides.

7. The dynamoelectric stator according to claim 1, characterized in that said slots are impregnated with a varnish.

* * * * *